(12) United States Patent
Askland et al.

(10) Patent No.: US 12,388,890 B2
(45) Date of Patent: *Aug. 12, 2025

(54) COMMUNICATION MANAGEMENT SYSTEMS AND METHODS FOR LOCAL DELIVERY SERVICE

(71) Applicant: Open Text SA ULC, Halifax (CA)

(72) Inventors: Christian Askland, Gothenburg (SE); Robert Smith, Gothenburg (SE); Christian Wessman, Gothenburg (SE)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,467

(22) Filed: Dec. 19, 2022

(65) Prior Publication Data
US 2023/0130476 A1    Apr. 27, 2023

Related U.S. Application Data

(63) Continuation of application No. 16/921,735, filed on Jul. 6, 2020, now Pat. No. 11,533,360, which is a continuation of application No. 15/987,467, filed on May 23, 2018, now Pat. No. 10,721,286.

(51) Int. Cl.
*H04L 67/025* (2022.01)
*G06F 3/06* (2006.01)
*G06F 3/12* (2006.01)

(52) U.S. Cl.
CPC .......... *H04L 67/025* (2013.01); *G06F 3/0643* (2013.01); *G06F 3/1227* (2013.01); *G06F 3/1288* (2013.01)

(58) Field of Classification Search
CPC ..... G06F 3/0643; G06F 3/1227; H04L 67/025
See application file for complete search history.

(56) References Cited

U.S. PATENT DOCUMENTS

| | | | | | |
|---|---|---|---|---|---|
| 5,937,161 | A | * | 8/1999 | Mulligan | H04L 51/214 340/7.29 |
| 5,974,449 | A | * | 10/1999 | Chang | H04M 3/5307 709/206 |
| 6,278,697 | B1 | * | 8/2001 | Brody | H04L 9/40 370/310 |

(Continued)

*Primary Examiner* — Douglas B Blair
(74) *Attorney, Agent, or Firm* — Sprinkle IP Law Group

(57) ABSTRACT

A local delivery service (LDS) operates in an enterprise computer network as a proxy for a communications server (CS) computer operating in a cloud computing environment. The LDS pulls a queue repository maintained by the CS and retrieves an output item flagged by the CS for local delivery. The output item has a document and associated configuration information specifying an application domain in the cloud computing environment and delivery settings specific to the application domain maintained by the CS. The LDS translates the delivery settings and routes the document to the connectors of communications channels of the enterprise computer network. In this way, documents produced by the CS in the cloud can be delivered locally to disparate destinations on the enterprise computer network without having to open individual ports in a firewall of the enterprise computer network to connect the CS with communications channels of the enterprise computer network.

20 Claims, 3 Drawing Sheets

(56) References Cited

U.S. PATENT DOCUMENTS

| | | | | |
|---|---|---|---|---|
| 7,649,983 B2* | 1/2010 | O'Neal | ............... | H04L 12/6418 |
| | | | | 379/88.16 |
| 10,721,286 B2* | 7/2020 | Askland | ................ | G06F 3/1227 |
| 11,533,360 B2* | 12/2022 | Askland | ................ | H04L 67/025 |
| 2003/0074408 A1* | 4/2003 | Clark | ....................... | H04L 51/48 |
| | | | | 709/225 |
| 2005/0138065 A1* | 6/2005 | Ciriza | ..................... | H04L 67/51 |
| 2005/0198389 A1* | 9/2005 | LaSalle | ................ | H04L 51/066 |
| | | | | 709/219 |
| 2009/0264111 A1* | 10/2009 | Bernard | ................ | H04W 12/08 |
| | | | | 455/414.3 |
| 2011/0173324 A1* | 7/2011 | Wang | ...................... | H04L 67/02 |
| | | | | 709/225 |
| 2011/0231501 A1* | 9/2011 | Swamidass | ........... | H04L 51/214 |
| | | | | 709/206 |
| 2014/0207911 A1* | 7/2014 | Kosmach | ................ | H04L 67/02 |
| | | | | 709/218 |
| 2015/0131130 A1* | 5/2015 | Miyasaka | ........... | H04N 1/00244 |
| | | | | 358/403 |
| 2017/0279957 A1* | 9/2017 | Abramson et al. | ...... | G06F 21/36 |
| 2018/0054414 A1* | 2/2018 | LeVasseur | ............. | G06Q 10/10 |

* cited by examiner

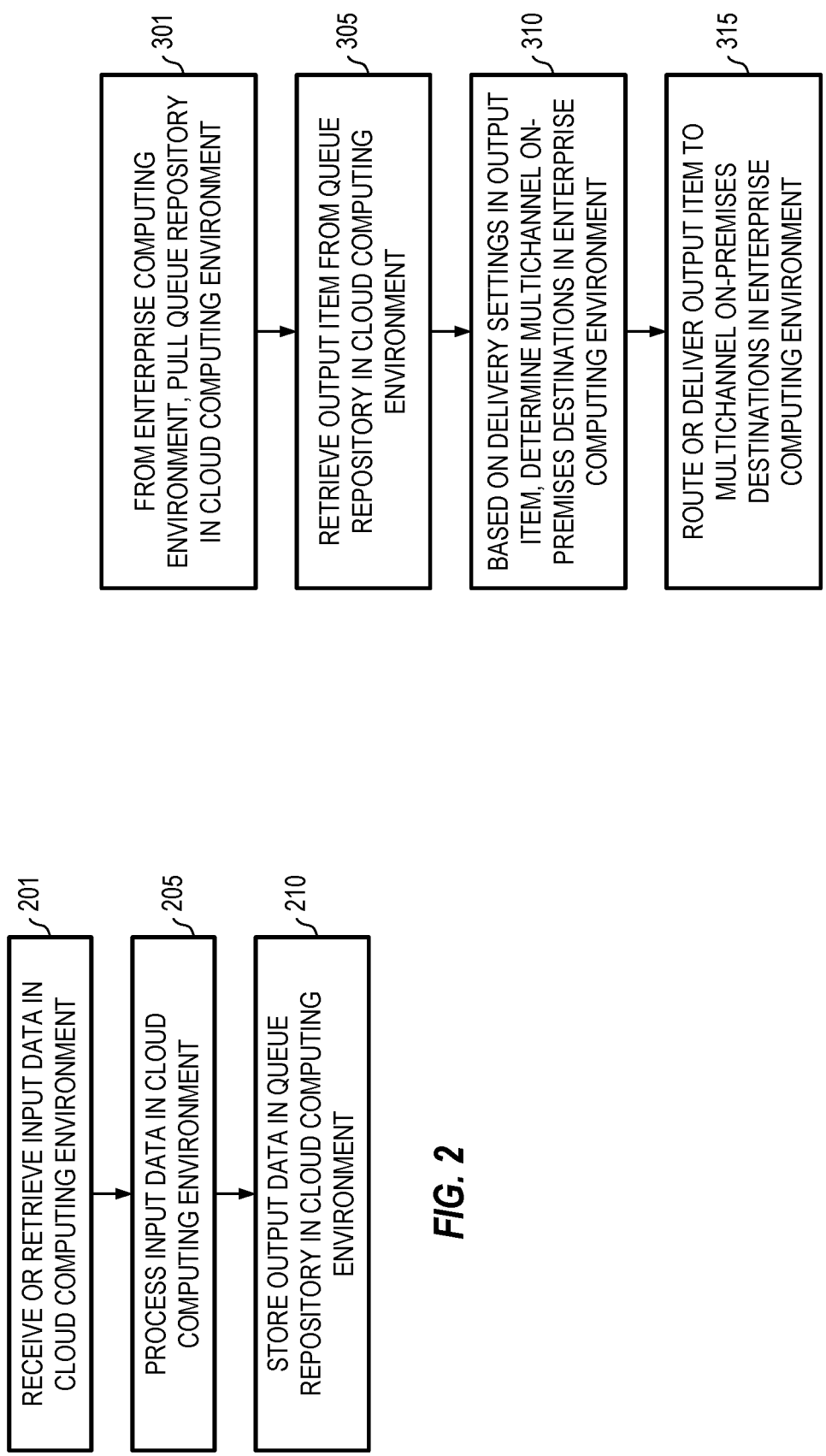

COMMUNICATION MANAGEMENT SYSTEMS AND METHODS FOR LOCAL DELIVERY SERVICE

CROSS-REFERENCE TO RELATED APPLICATION(S)

This application is a continuation of, and claims a benefit of priority under 35 U.S.C. § 120 from, U.S. patent application Ser. No. 16/921,735, filed Jul. 6, 2020, entitled "COMMUNICATION MANAGEMENT SYSTEMS AND METHODS FOR LOCAL DELIVERY SERVICE," issued as U.S. Pat. No. 11,533,360, which is a continuation of, and claims a benefit of priority under 35 U.S.C. § 120 from, U.S. patent application Ser. No. 15/987,467, filed May 23, 2018, issued as U.S. Pat. No. 10,721,286, entitled "COMMUNICATION MANAGEMENT SYSTEMS AND METHODS FOR LOCAL DELIVERY SERVICE," which are fully incorporated by reference herein for all purposes.

TECHNICAL FIELD

This disclosure relates generally to distributed computing and data delivery. More particularly, this disclosure relates to communication management systems, methods, and computer program products for securely delivering documents produced in a cloud computing environment to on-premises destinations on an enterprise computer network in a manner that minimizes potential risk to the network security of the enterprise computer network.

BACKGROUND OF THE RELATED ART

Customer communications management (CCM) refers to a set of Information Technology (IT) solutions that together provide companies, organizations, and enterprises alike with the ability to advance how they communicate and engage with their customers. A CCM solution (e.g., OpenText™ CCM, available from Open Text, headquartered in Canada) enables an enterprise to communicate with their customers as individuals across multiple channels in a single voice throughout the customer relationship lifecycle.

For example, an employee of the enterprise can use a document template previously approved by the enterprise to design a document (e.g., a letterhead, invoice, correspondence, statement, marketing brochure, etc.). This is an efficient to create a document and ensures automatic compliance with the enterprise's policies, such as including an enterprise logo, an approved disclaimer, etc.

The document can then be mass-produced in a variety of digital and print formats with personalized information (e.g., name, address, etc.) for individual customers and delivered over multichannel communications such as print, fax, email, SMS, social media, and portal publication. A CCM solution thus can include software that can be used to compose, format, personalize, and distribute content to support physical and electronic customer communications and improve the customer experience.

Traditionally, a CCM solution is incorporated into an enterprise's IT infrastructure and operates on the premises of the enterprise over the enterprise's private computer network. For example, a CCM server application may be installed on a server machine operating on the enterprise's private computer network behind the firewall that protects the enterprise's private computer network.

In recent years, cloud-based CCM solutions offer enterprises a way to leverage the computational power and storage capability of cloud computing. However, in a cloud-based CCM solution, communication documents are produced in a cloud computing environment (also referred to herein as a "cloud"), outside of an enterprise's private computer network. They cannot be easily delivered using the enterprise's infrastructure without potentially compromising the enterprise's network security.

SUMMARY OF THE DISCLOSURE

An object of the invention is to provide an improved cloud-based CCM solution that enables an enterprise to run a centralized CCM environment in a cloud (e.g., OpenText™ Cloud) and deliver communication documents locally on the enterprise's private computer network like an on-premises CCM, without needing to open individual ports in the enterprise's firewall.

In some embodiments, this object can be realized by a local delivery service running on a server machine in an enterprise computer network. The local delivery service pulls, from inside the enterprise computer network, a queue repository maintained by a communications server operating in a cloud computing environment. Because the pulling request is sent by the local delivery service from the inside out, it can pass through the enterprise computer network's firewall without compromising the network security of the enterprise computer network.

The queue repository contains output items flagged by the communications server for local delivery. Flagging may occur, for instance, in a document production process instantiated by the communications server in response to a request from a CCM client application to produce communication documents using user-provided input data.

The local delivery service receives an output item from the queue repository maintained by the communications server. The output item contains a document produced by the communications server. The local delivery service gets the document and associated configuration information from the cloud into the enterprise computer network over a standard hypertext transfer protocol (HTTP) such as an HTTP secure (HTTPS) channel. That is, the local delivery service sends a pulling request to the communications server and, in response, receives a web response from the communications server over the HTTPS. Because the web response is communicated over the HTTPS, there is no need to open a port in the firewall to connect with the communications server.

The associated configuration information that the local delivery service gets from the cloud specifies an application domain in the cloud computing environment. The application domain is monitored by the local delivery service. This confirms to the local delivery service that the document is in the right hand for delivery. The associated configuration information can include settings for output connectors configured for multiple communications channels of the enterprise computer network. The output connectors can include, for instance, a printer connector for a printer on the enterprise computer network, an email server connector, an archive server connector, a web portal connector, a message server connector, etc. The settings can include information necessary to make a delivery to a destination on the enterprise computer network, for instance a network address for the printer on the enterprise computer network.

The associated configuration information that the local delivery service gets from the cloud also specifies delivery settings specific to the application domain. The delivery settings are centrally maintained by the communications server. The local delivery service can determine, based at least on the delivery settings received from the communications server, where the document is to be delivered on the enterprise computer network and through what communications channels, for instance, a printer, a print server, an email exchange server, an archive server, a message server, an Internet portal, etc.

The local delivery service can then route the document to the multiple communications channels of the enterprise computer network on behalf of the communications server. To this end, the local delivery service can be considered a scaled-down version of the communications server without a database and can function as a proxy of the communications server to make local deliveries of documents to destinations on the enterprise computer network. In this way, the document can be delivered to disparate destinations on the enterprise computer network without requiring opening individual ports in the firewall of the enterprise computer network to connect the communications server operating in the cloud computing environment with the multiple communications channels of the enterprise computer network.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 depicts a flow chart illustrating a method for document production in a cloud computing environment according to some embodiments.

FIG. 3 depicts a flow chart illustrating a method for local network delivery of cloud-produced communication documents according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
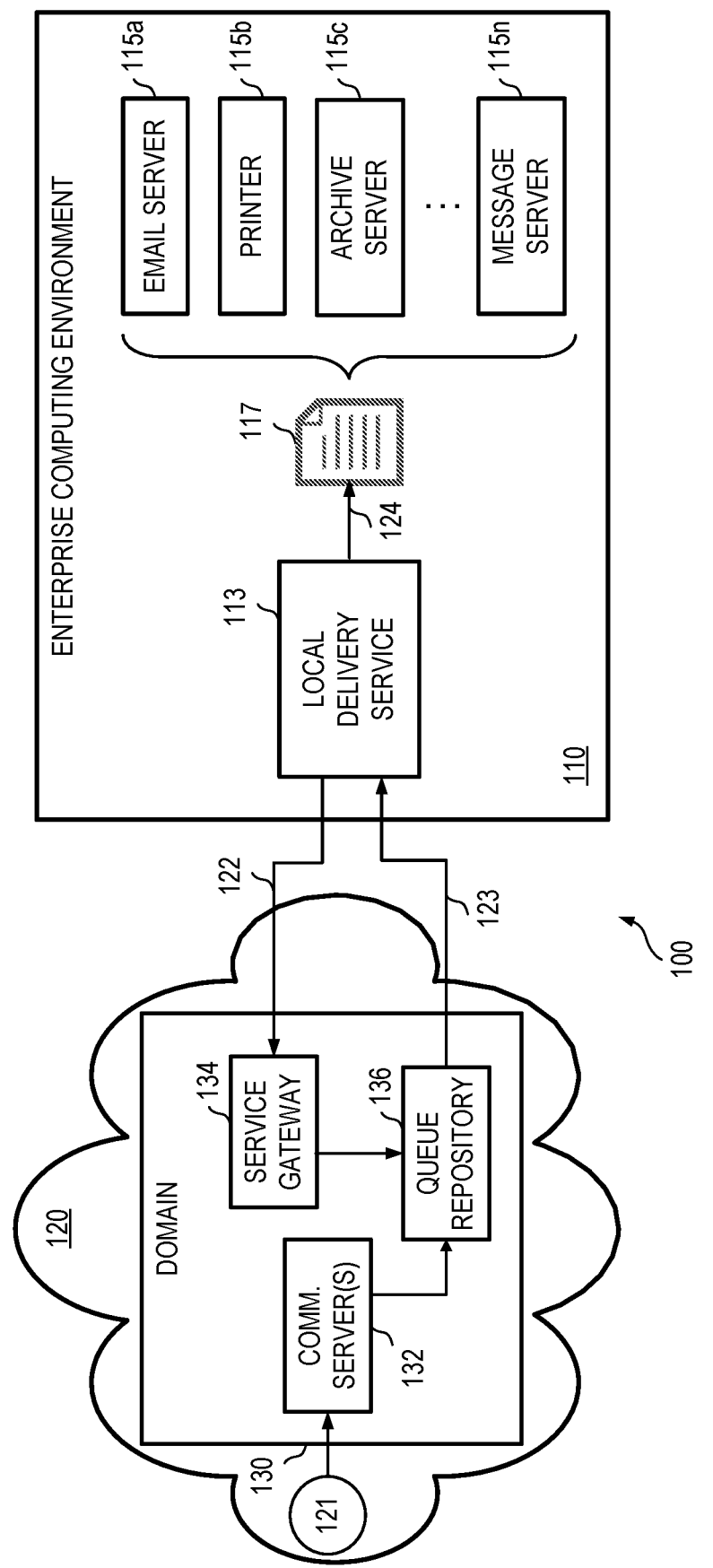
FIG. 1 depicts a diagrammatic representation of an example enterprise computing environment where embodiments disclosed herein can be implemented.

FIG. 1 depicts a diagrammatic representation of an example enterprise computing environment where embodiments disclosed herein can be implemented.

In network 100, cloud 120 hosts application domain 130 that includes communications server(s) 132, service gateway 134, and queue repository 136. Local delivery service 113 runs in enterprise computing environment 110 behind the firewall (not shown). Local delivery service 113 periodically pulls queue repository 136 through service gateway 134 over communication channel 122 to see if there is any output item in queue repository 136 that has been flagged by communications server(s) 132 for local delivery. If so, the output item is sent to local delivery service 113 over communication channel 123. Both communication channels 122, 123 can implement the standard HTTP channels. For example, local delivery service 113 can make an HTTP call over communication channel 122 and receives a web response through communication channel 123 over HTTPS.

Local delivery service 113 is operable to translate or interpret delivery settings in output item 117 thus retrieved from cloud 120 and routes output item 117 via appropriate output connectors 124 to local network destinations 115a, 115b, 115c, . . . , 115n. OpenText™ Cloud can be an example of cloud 120.

Local delivery service 113 is a lightweight communications server application configured to act as a proxy for communications server(s) 132. It can function much like communications server(s) 132. However, local delivery service 113 does not have a database to store local delivery settings. Rather, delivery settings are centrally maintained in cloud 120 by communications server(s) 132 and retrieved with each output item destined for enterprise computing environment 110. It also does not have any dependencies so it can run as a slimmed-down communications server on an enterprise computer network. Accordingly, local delivery service 113 can be considered a communications proxy server.

Although local delivery service 113 is deployed on enterprise computing environment 110, it can directly connect to communications server(s) 132 (the remote instance of the delivery service in cloud 120) and act as a local proxy for all the deliveries on enterprise computing environment 110. For example, if a user in enterprise computing environment 110 wants an email delivered to multiple recipients on enterprise computing environment 110, the user can instruct communications server(s) 132 through enterprise application 121 that the email is for "local" delivery. Enterprise application 121 can be any suitable enterprise system that has a separate dedicated, point-to-point secure channel connection with any of communications server(s) 132. Examples of enterprise application 121 can include, but are not limited to, an enterprise resource planning (ERP) system, invoice management software, accounts payable and receivable management application, billing and invoice software, etc.

The email is received, along with the "local" delivery setting, by communications server(s) 132. Communications server(s) 132 prepare output items (document production) based on the input data (which, in this example, is the email). Communications server(s) 132 can personalize each output item (e.g., a personalized email addressed to an individual recipient based on the original email provided by the user) and flag the output item for local delivery. As explained below, the output item is then retrieved by local delivery service 113 and delivered within enterprise computing environment 110, along with other output items flagged for local delivery.

Depending upon the channel a delivery is to be made, input data may need to be produced in different formats. For example, text files cannot be sent to a printer, so a printer-formatted document must first be produced. This is referred to herein as document production. Each delivery channel has its own format requirements (e.g., what input format a printer supports for printing, etc.). Local delivery service 113 is configured for handling various delivery formats combined with various delivery protocols. Document production can be computationally intensive as documents must be properly assembled and formatted. For instance, utility bills, credit card statements, and so on are examples of documents that come with graphics, advanced tables, summary, contact details, bar codes, etc. in the documents. They may need to be produced by merging layout of a document with variable data coming from a source system (e.g., a billing system). A source document (e.g., an invoice as input) can be a JSON object, an XML file, etc. from the billing system, or has an intermediate document format such as iDOC (which is a proprietary format with business details and without any format or layout or anything like graphical tables that would make this human-readable). The input data stream is combined with a layout that is maintained in communications server(s) 132 to produce document instances automatically. That is, each of the utility billing documents, each of the credit card statements, etc. is produced by combing the incoming raw input data with the layout, and also combining with the delivery configuration information. Output items thus produced can have different formats (e.g., an output item is a postscript file, another output item is a PDF, etc.).

An output item can also be produced such that it is suitable for certain types of storage (e.g., long term archiving). For example, a user in enterprise computing environment 110 may wish to archive electronic invoices. The user can indicate to communications server(s) 132 (e.g., through enterprise application 121) that invoices should be archived locally within enterprise computing environment 110. Communications server(s) 132 can generate a legal copy of the invoices suitable for archiving and indicates in the local delivery setting that this output item is for a local archive. Again, this local delivery setting is communicated to local delivery service 113 through communications server(s) 132 (e.g., by storing the local delivery setting with the corresponding output item, which, in this example, is the legal copy of the invoices in queue repository 136).

In some embodiments, there can be multiple local delivery services. Each local delivery service retrieves and delivers output from a single application domain in a cloud according to a specified schedule. "Retrieve," in this context, includes two actions by a local delivery service-sending a pulling request from inside of an enterprise computing environment to pull a queue repository in a cloud and receiving a web response from a communications server responsive to the pulling request from the local delivery service. In some embodiments, the local delivery service can be implemented as a Windows service or a Linux process that runs on a server machine operating in an enterprise computer network such as enterprise computing environment 110.

Enterprise computing environment 110 is an example of a private computer network. A private computer network may utilize one or more firewalls to protect itself from unwanted intrusions (e.g., hacking) and attacks. In computing, a firewall refers to a network security system that monitors and controls incoming and outgoing network traffic based on predetermined security rules and polices. These security rules and polices can be managed (e.g., by a network security specialist or network administrator) using attributes, including ports and services, users and groups, etc. For computers and devices to receive network traffic from outside of the private computer network, for instance, from a cloud-hosted application, a port must be opened in the firewall to identify and establish a network connection with the cloud-hosted application. To this end, port filtering is an important feature of a firewall as it allows certain port-based network protocol packets to pass through the firewall and blocks the rest. However, each time a port is opened in the firewall, it exposes the private computer network to the potential risk of a hacker using the opened port to attack machines on the private computer network.

Further, each port opened in the firewall allows for a one-to-one communication between an external system (e.g., the cloud-hosted application) and a computer or device on the private computer network. Thus, for the external system to communicate directly with multiple communications channels (e.g., printers, servers for email, archive, messaging, etc.), multiple ports must be opened in the firewall. This can lead to an undesirable scenario in which too many ports are opened through the firewall, leaving the private computer network vulnerable to attacks.

Embodiments disclosed herein can eliminate the need to open ports in the firewall and still allow an external system (e.g., a cloud-based server such as communications server(s) 132) to make deliveries to a private computer network (e.g., enterprise computing environment 110) over multiple communications channels (e.g., network destinations 115*a*, 115*b*, 115*c*, . . . , 115*n*). Since there is no need to open any port in the firewall, the security risk is advantageously eliminated.

Generally, a firewall allows inside-to-outside communications, but prevents outside-to-inside communications. Embodiments disclosed herein leverage this direction of communications in several ways. For example, because a firewall allows inside-to-outside communications, a user can provide local delivery configuration information from a user device inside of enterprise computing environment 110 to communications server(s) 132 operating in cloud 120 (e.g., by logging in enterprise application 121 and providing local network delivery settings, etc.). Communications server(s) 132 can interpret the local network delivery configuration and make a delivery through its local delivery service over another secure channel that does not require opening a port in the firewall (e.g., HTTPS).

As another example, local delivery service 113 (which can run on a desktop machine inside of a private computer network) can connect to communications server(s) 132 operating in cloud 120 over a secure HTTP channel (e.g., HTTPS) from inside of enterprise computing environment 110. As discussed above, this direction of communications (from the inside to the outside) is almost always allowed by a firewall. Once connected, local delivery service 113 can establish an open channel with communications server(s) 132 (e.g., log into eXstream CCM solution hosted in OpenText™ Cloud) over which it can receive information such as a local delivery request to send an email to an email server (e.g., email server 115a on enterprise computing environment 110), send a print request to print a document to a printer (e.g., printer 115b on enterprise computing environment 110), send an archiving request to an archive server (e.g., archive server 115c on enterprise computing environment 110), etc.

Once local delivery service 113 is authenticated by communications server(s) 132, it listens for delivery requests made in application domain 130. In some embodiments, delivery requests can be directly relayed to local delivery service 113 for local deliveries to destinations within enterprise computing environment 110. In turn, local delivery service 113 communicates automatically produced communications documents (e.g., emails, prints, messages, etc.) that are preconfigured by communications server(s) 132 in cloud 120 to local multichannel output connectors so the communications documents can be delivered to disparate destinations within enterprise computing environment 110. The output connector selection and settings can be based on the delivery configuration made to the communications server application in the cloud (e.g., communications server(s) 132).

Local delivery service 113 does not synchronize documents. Rather, it is operable to translate or interpret delivery configuration information so that communications generated outside of enterprise computing environment 110 can be delivered to different designations the across network boundary (e.g., cloud 120 to enterprise computing environment 110) as if they are local. In this way, centralized controlled communications requests generated in cloud 120 are redistributed within enterprise computing environment 110.

FIG. 2 depicts a flow chart illustrating a method for document production in a cloud computing environment according to some embodiments. As an example, a user in enterprise computing environment 110 may use enterprise application 121 to generate invoices that need to be mailed, emails that need to be sent, documents that need to be printed and mailed, records that need to be archived, messages that need to be distributed, and so on. As discussed above, such an enterprise application can be connected to communications server(s) 132 operating in cloud 120 over a separate dedicated channel for automated document production (e.g., invoices, emails, messages, various types of documents, and so on). Local delivery service 130 does not change this existing relationship.

That is, customers of communications server(s) 132 can continue to leverage a centralized customer communication management environment to produce things like billing documents, statements, marketing emails, etc., representing disparate types of communications that can be derived from a template and automated with data in a central location, outside of the respective customer networks. This allows the customers of communications server(s) 132 to leverage flexibility, fault tolerant, cheaper hardware, and other benefits of cloud 120.

Local delivery service 130 does not change the existing relationship between communications server(s) 132 and enterprise application 121. Rather, local delivery service 130 solves the challenge of getting these communications delivered on premises, on the respective customer networks. Local delivery service 130 can facilitate everything from archiving a document in a record-compliant legal archive, to printing documents locally on office printers, to sending emails through a corporate email server, and so on.

In some embodiments, communications server(s) 132 may receive or retrieve input data, for instance, an invoice, email, message, etc. that is composed by a user in cloud 120 (201). The input data includes delivery instructions on where to send communications documents produced from the input data. For example, the delivery instructions may specify multiple channels (e.g., send to archive server 115c, send to printer 115b, etc.) in a local network environment (e.g., enterprise computing environment 110, which is local to the user).

In some embodiments, communications server(s) 132 in application domain 130 act as the central command center that is configured and maintained by a network administrator of enterprise computing environment 110. Individual customer settings (e.g., what kind of communication channels 115a, 115b, 115c, . . . , 115n in enterprise computing environment 110 for delivery) can be stored in a database local to communications server(s) 132. The network administrator can configure delivery rules and logic in communications server(s) 132. Input data from enterprise application 121 (e.g., bill run, invoices, etc.) can be processed by communications server(s) 132 in accordance with the preconfigured delivery rules and logic.

Communications server(s) 132 may operate to process the input data in cloud 120 following any template-based document production scenario. This means that variable data can come from a source system (e.g., enterprise application 121) representing a customer, an invoice, any business object (e.g., XML data). Communications server(s) 132 may maintain a communications template showing what the invoice would look like with placeholders. These placeholders can represent where a customer name and customer address would go on a document thus produced. These variables from sources can be used to control how those documents get delivered. For example, in a billing application, a user can set communications preferences or the communications preferences may have been set up to define how documents should be delivered (e.g., customer A wants documents emailed, customer B wants documents printed and mailed, customer C wants documents stored in the portal only and accessible by mobile devices, etc.). These are communications preferences maintained in the source system. Any such data can be used to define a business rule in how to deliver that communication. As a specific example, a rule can be set up to specify that customer A would get document emailed, customer B would get documents printed and mailed, customer C would get documents stored in the portal only and accessible by mobile devices, etc. All these delivery settings (rules) are translated by their respective local delivery services (e.g., send this document to the email server, send this document to the printer and the mailing service, send this document to a data store for the portal, etc.).

In some embodiments, communications server(s) 132 may operate on multitenant architecture and can store different configuration settings for different multiple tenants/customers. Multitenant architecture refers to a software architecture in which a single instance of software runs on a server and serves multiple tenants. A tenant can be a group of users who share a common access with specific privileges to the software instance. Multitenant architecture is known to those skill in the art and thus is not further described herein.

In operation, suppose the input data is from customer A (uploaded from customer A's ERP system or billing applications), communications server(s) 132 may operate to examine customer A's configuration settings. In this case, customer A's configuration settings indicate that invoices should be delivered over two communications channels, an email server and an onsite printer. Communications server(s) 132 can have various output connectors, including a print connector and an email connector. The print connector is configured for handling print requests to the office print server on customer A's premises. The print connector may contain a network (e.g., Internet Protocol or IP) address of the office print server. The email connector is an email SMTP server type and contains the IP address of the on-premises email exchange server. These output connectors are flagged as capable of local delivery and each specifies a setting for local delivery (a delivery setting that is to be translated by the local delivery service).

With the input data from customer A, communications server(s) 132 can produce a large set of XML files (e.g., invoices) (205). Outputs from communications server(s) 132 can depend on the tenant (customer A) and output connector(s) used by the tenant. For example, for a printer, it could be a post-script document that is being generated for an invoice. For an email document, it could be a HTML type of format or a PDF attachment to the email that is being generated.

Communications server(s) 132 can apply rule(s) associated with the tenant and determine how the communications documents thus generated should be delivered (210). For example, the rules may dictate that, depending upon each bill-to customer in the invoice, store a communications document thus generated in the queue repository, directly to a mobile application, etc. Communications documents stored in the queue repository are not submitted to a printer or an email server by communications server(s) 132 because they have been flagged (declared) for local delivery connector. They wait in the queue repository for the local delivery service to connect to communications server(s) 132 to retrieve them up. Communications documents that are not flagged for local delivery can be handled directly by communications server(s) 132. Although they are not flagged for local delivery, they are flagged for delivery, for instance, via a push notification, to a mobile application.

FIG. 3 depicts a flow chart illustrating a method for local network delivery of cloud-produced communication documents according to some embodiments.

As discussed above, a local delivery service can connect from behind a private computer network's firewall to pull a queue repository in a cloud computing environment (301). The local delivery service may find that there are a number of documents that should be delivered to local email or local print and download (retrieve) the documents from the queue repository (305). The local delivery service can translate the delivery settings that it gets from the central communications server (e.g., communications server(s) 132) with the documents and determine whether the documents are to be delivered to a local printer and/or a local exchange server (310). The local delivery service can then route or deliver the documents to multichannel on-premises destinations in the private computer network (e.g., enterprise computing environment 110) (315).

In some embodiments, the retrieval/download can be achieved over an encrypted HTTPS channel. The format inside the HTTPS channel would depend on the delivery channel (e.g., post-script document for a printer, HTML document (for email), etc.). The interactions between the local delivery service and the central communications server would appear to the private computer network's firewall as a normal web request and response. However, the local delivery service is configured with knowledge on how to translate/decrypt the response, and its payload, from the central communications server. Optionally, the local delivery service can take action and determine whether a particular document request should be delivered locally.

As alluded to above, the local delivery service can be installed on the private computer network by a network administrator or a system administrator. Because the local delivery service is a piece of lightweight software, it does not require a lot of computational footprint. It requires very minimum memory and no database. When installed (which is a one-time activity only) on the private computer network, the local delivery service is configured with a host name, IP address, where the configuration can be located in the central communications server, authentication details, etc. Once installed, the local delivery service is always running to check where there are delivery requests in the central communications server (by pulling the queue repository for any document that is flagged for local delivery to an address within a network that the local delivery service recognizes). The local delivery service asks for the document and output connector settings and down details needed to make the local delivery.

The local delivery service leverages the standard communications protocol (e.g., HTTPS) to get out to the Internet and into a cloud. Because the local delivery service is a scaled down central communications server (that operates in the cloud computing environment), the local delivery service can handle any input/output delivery activities and run as a local service for the private computer network. This means that it can handle dynamically any type of complexity of where to deliver communications. Some of this uniqueness is multichannel communications supporting email, print, FTP, JMS, database, HTTP delivery request, HTTPS delivery request in the same service, without the need to maintain that configurations in the local delivery service. Instead, the local delivery service translates the central configuration locally and take appropriate actions. The document and the output connector settings are packaged into a web response and communicated over the HTTPS.

In this context, translation means unpacking the web response from the central communications server and communicating with different output connectors. The HTTP response is responsive to the HTTP request from the local delivery service. The HTTP request is sent through the gateway in the cloud (so, technically, the HTTP request can be a REST call, a web service call, etc.) to the queue repository, looking for pending documents for local delivery (which otherwise cannot be reached from the cloud). In response, the central communications server sends the HTTP response (which, technically, can be a multi-part web response).

The payload in the multi-part web response can include, in one part, a postscript file to a local office printer. The other part can include connector settings and delivery instructions. These can contain the server address of the local print server, potentially a user credential such as user name and password if needed for authentication, all of which are entirely maintained in the central communications server.

The local delivery service utilizes a translation mechanism similar to what is used by the central communications server to interpret how to deliver a local email. It gets connector type information (e.g., delivery by email requires a specific email communications protocol), email address detail, and other settings necessary to deliver emails. Also, it downloads output connector settings from the central communications server alongside the document (e.g., binary content) that should be emailed to an end recipient.

To the private computer network's firewall, it sees a computer within the private computer network that is making an encrypted HTTP request to a remote server and receives an HTTP response. This interaction can be the same as what a web browser does. However, the request and the response contain proprietary information (including specification instructions that only the local delivery service understands). The firewall would not block such a network transaction (because the web response is received over a standard secure channel) while protecting local servers.

To achieve this another way is to open ports from the central communications server in the cloud computing environment into the private computer network to connect to the print service, to the archive server, to the email server, and to any server that the central communications server need to send documents. These ports would need to be opened in the private computer network's firewall which would introduce security risk (e.g., a hacker may hack into the private computer network through an open port).

Again, the local delivery service can solve this problem by connecting from the other direction and carry out the deliveries on its own once it has the instructions (contained in the encrypted response from the central communications server) received over the HTTPS channel. The local delivery service can support all the communications that can be done in the cloud computing environment.

Essentially, some of the central communications server's delivery functions are implemented in the central communications server's proxy on premises of a private computer network so that individual ports do not need to be opened in the private computer network's firewall (in which one port would have been needed to open per each output device/server). This prior port-based solution does not scale (because as the private computer network grows, many more ports would need to be opened). The number of open ports can become unmanageable and can significantly increase network security risk.

Embodiments disclosed herein can be particularly useful for enterprise document production and delivery. Enterprises have these challenges-they need to send invoices (so they need to produce documents and deliver them to local printers, email servers, archive servers, etc.). They want to offload these processing needs to the cloud, but still want the processing results to be delivered locally to network servers, devices, etc. Embodiments disclosed herein can avoid having to expose each and every printer, email server, archive server, message server, etc. on the enterprise's private network to the outside world in order to print locally automatically. The central communications server can support a large number of connector types, e.g., 30 different communications protocols, to handle document production in the cloud, while the local delivery service can handle the fundamental delivery services in the enterprise's private network. This leaves the computational-intensive tasks of document production in the cloud and deliveries can be made automatically locally in an efficient way.

Figure 4:
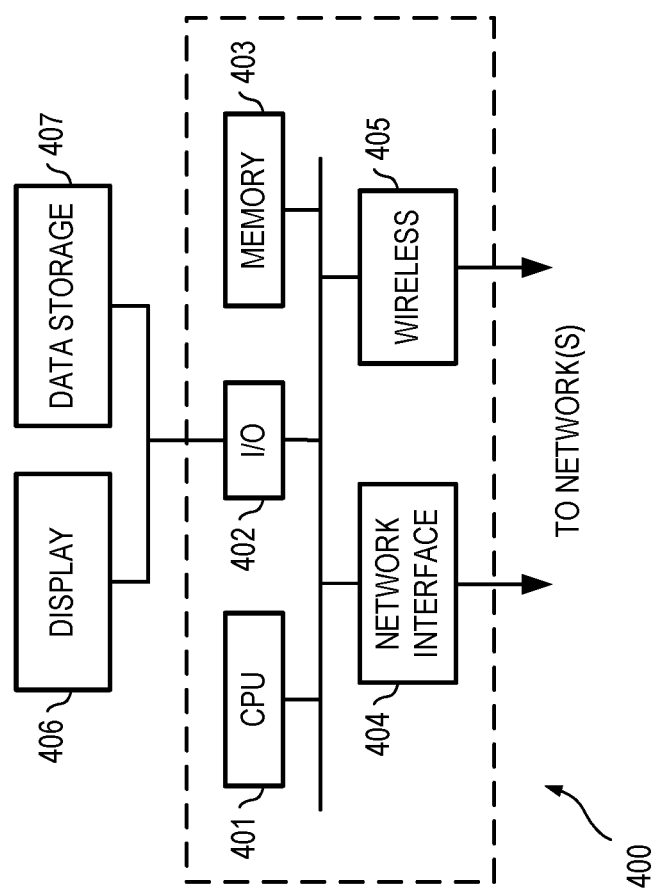
FIG. 4 depicts a diagrammatic representation of an example of a data processing system for local delivery according to some embodiments.

FIG. 4 depicts a diagrammatic representation of an example of a data processing system for local delivery according to some embodiments. As shown in FIG. 4, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, data storage 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python, C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
pulling, by a local delivery service running on a server machine in an enterprise computer network from a communications server computer operating in a cloud computing environment over a standard communication channel, a queue repository operating in the cloud computing environment for items flagged for local delivery, wherein the enterprise computer network is protected from the cloud computing environment by a firewall;
determining, by the local delivery service and based on the pulling, that the queue repository comprises a flagged document for local delivery;
receiving, by the local delivery service from the communications server computer, an item containing the flagged document and associated delivery settings managed by the communications server computer;
determining, by the local delivery service based at least in part on the associated delivery settings, a one or more destinations on the enterprise computer network; and
sending, by the local delivery service through communications channels local to the enterprise computer network, the document to the one or more destinations on the enterprise computer network.

2. The method according to claim 1, further comprising: processing the document for a plurality of delivery channels, each of the plurality of delivery channels having a set of format requirements, wherein the processing produces versions of the document in different formats for the plurality of delivery channels.

3. The method according to claim 1, wherein the local delivery service comprises a lightweight communications server application configured for directly communicating with the communications server computer operating in the cloud computing environment.

4. The method according to claim 1, wherein the associated delivery settings comprise rules translatable by the local delivery service for sending the document to the plurality of destinations on the enterprise computer network.

5. The method according to claim 1, wherein the plurality of destinations comprise at least one of an email server, a printer, a print server, an archive server, a message server, a mailing service, a data store, a portal, or a network device.

6. The method according to claim 1, wherein the communications server computer comprises output connectors, at least one of which specifies a setting for local delivery by the local delivery service.

7. The method according to claim 1, wherein the item is stored in the queue repository in accordance with a tenant-specific rule applied by the communications server computer operating in the cloud computing environment, the tenant-specific rule associated with the enterprise computer network.

8. A system, comprising:
a processor;
a non-transitory computer-readable medium; and
instructions stored on the non-transitory computer-readable medium and translatable by the processor for operating a local delivery service on a server machine in an enterprise computer network, the local delivery service configured for:
pulling, from a communications server computer operating in a cloud computing environment over a standard communication channel, a queue repository operating in the cloud computing environment for items flagged for local delivery, wherein the enterprise computer network is protected from the cloud computing environment by a firewall;
determining, based on the pulling, that the queue repository comprises a flagged document for local delivery:
receiving, from the communications server computer, an item containing the flagged document and associated delivery settings managed by the communications server computer;
determining, based at least in part on the associated delivery settings, a plurality of one or more destinations on the enterprise computer network; and
sending the flagged document through communications channels local to the enterprise computer network to the one or more destinations on the enterprise computer network.

9. The system of claim 8, wherein the instructions are further translatable by the processor for:
processing the document for a plurality of delivery channels, each of the plurality of delivery channels having a set of format requirements, wherein the processing produces versions of the document in different formats for the plurality of delivery channels.

10. The system of claim 8, wherein the local delivery service comprises a lightweight communications server application configured for directly communicating with the communications server computer operating in the cloud computing environment.

11. The system of claim 8, wherein the associated delivery settings comprise rules translatable by the local delivery service for sending the document to the plurality of destinations on the enterprise computer network.

12. The system of claim 8, wherein the plurality of destinations comprise at least one of an email server, a printer, a print server, an archive server, a message server, a mailing service, a data store, a portal, or a network device.

13. The system of claim 8, wherein the communications server computer comprises output connectors, at least one of which specifies a setting for local delivery by the local delivery service.

14. The system of claim 8, wherein the item is stored in the queue repository in accordance with a tenant-specific rule applied by the communications server computer operating in the cloud computing environment, the tenant-specific rule associated with the enterprise computer network.

15. A computer program product comprising a non-transitory computer-readable medium storing instructions translatable by a processor for operating a local delivery service on a server machine in an enterprise computer network, the local delivery service configured for:
pulling, from a communications server computer operating in a cloud computing environment over a standard communication channel, a queue repository operating in the cloud computing environment for items flagged for local delivery, wherein the enterprise computer network is protected from the cloud computing environment by a firewall;
determining, based on the pulling, that the queue repository comprises a flagged document for local delivery:

receiving, from the communications server computer, an item containing the flagged document and associated delivery settings managed by the communications server computer;

determining, based at least in part on the associated delivery settings, one or more destinations on the enterprise computer network; and sending the flagged document through communications channels local to the enterprise computer network to the one or more destinations on the enterprise computer network.

16. The computer program product of claim 15, wherein the instructions are further translatable by the processor for:

processing the document for a plurality of delivery channels, each of the plurality of delivery channels having a set of format requirements, wherein the processing produces versions of the document in different formats for the plurality of delivery channels.

17. The computer program product of claim 15, wherein the local delivery service comprises a lightweight communications server application configured for directly communicating with the communications server computer operating in the cloud computing environment.

18. The computer program product of claim 15, wherein the associated delivery settings comprise rules translatable by the local delivery service for sending the document to the plurality of destinations on the enterprise computer network.

19. The computer program product of claim 15, wherein the plurality of destinations comprise at least one of an email server, a printer, a print server, an archive server, a message server, a mailing service, a data store, a portal, or a network device.

20. The computer program product of claim 15, wherein the item is stored in the queue repository in accordance with a tenant-specific rule applied by the communications server computer operating in the cloud computing environment, the tenant-specific rule associated with the enterprise computer network.

\* \* \* \* \*